United States Patent [19]
Grand

[11] Patent Number: 4,666,229
[45] Date of Patent: May 19, 1987

[54] STRAIN RELIEF DEVICE

[75] Inventor: Guy C. Grand, Crepy en Valois, France

[73] Assignee: Compagnie Francaise del Isolants, France

[21] Appl. No.: 707,264

[22] Filed: Mar. 1, 1985

[30] Foreign Application Priority Data

Mar. 2, 1984 [GB] United Kingdom ............... 8405556

[51] Int. Cl.⁴ .............................................. H01R 13/58
[52] U.S. Cl. ................................ 339/104; 339/103 M
[58] Field of Search ............... 339/89 C, 89 M, 90 C, 339/103 R, 103 M, 109, 177 R, 177 E

[56] References Cited

U.S. PATENT DOCUMENTS

| | | | |
|---|---|---|---|
| 2,445,033 | 7/1948 | Mettz | 173/361 |
| 2,700,140 | 1/1955 | Phillips | 339/89 M X |
| 3,037,069 | 5/1962 | Wilson | 339/103 M |
| 3,097,033 | 7/1963 | Felts | 339/103 M X |
| 3,646,496 | 2/1972 | Williams | 339/89 M X |
| 3,732,527 | 5/1973 | McKnight | 339/103 M |
| 3,763,460 | 10/1973 | Hatschek et al. | 339/89 M |
| 4,025,145 | 5/1977 | Shaffer et al. | 339/89 M X |
| 4,053,200 | 10/1977 | Pugner | 339/177 R |
| 4,272,148 | 6/1981 | Knack, Jr. | 339/143 R |

FOREIGN PATENT DOCUMENTS

| | | |
|---|---|---|
| 0034792 | 9/1981 | European Pat. Off. . |
| 1300249 | 6/1962 | France . |
| 2150467 | 4/1973 | France ............... 339/104 |
| 246694 | 2/1926 | United Kingdom . |
| 275967 | 6/1928 | United Kingdom . |
| 693929 | 7/1953 | United Kingdom . |
| 930096 | 7/1963 | United Kingdom . |
| 1206362 | 9/1970 | United Kingdom . |
| 1311796 | 3/1973 | United Kingdom . |
| 1452575 | 9/1974 | United Kingdom . |
| 1509720 | 8/1975 | United Kingdom . |
| 1546530 | 5/1979 | United Kingdom . |
| 1563359 | 3/1980 | United Kingdom . |
| 2042817A | 9/1980 | United Kingdom . |
| 1604202 | 12/1981 | United Kingdom . |

Primary Examiner—Eugene F. Desmond
Attorney, Agent, or Firm—Ira D. Blecker

[57] ABSTRACT

The invention provides a strain relief device for a sleeved wire bundle. The sleeve of a wire bundle is gripped between the telescoped portion of first and second annular gripping members, the gripping being effected independently of the wire bundle. The sleeve is gripped by the gripping members as a result of telescoping one member into the other. Preferably, the gripping members fit together with a snap fit. The device may be provided with a support for the wire bundle, to center the bundle in the device and to provide further strain relief.

9 Claims, 6 Drawing Figures

STRAIN RELIEF DEVICE

DESCRIPTION

This invention relates to a strain relief device for a wire bundle.

Where a bundle of wires is joined, for example, to a connector the wires are susceptible to being torn away from the connector as a result of stresses on the wires, for example stresses caused by axial pulling stresses on the wires or by vibrating movements of the apparatus in which the connector is mounted. Vibrating movements are a particular problem in mobile equipment for example in land, sea and air vehicles. It is thus desirable to provide strain relief of the wire bundle at the point where it joins the connector in order to protect against tearing away of the wires.

One known type of strain relief device is described in U.S. Pat. No. 3,732,527. The device comprises a cylindrical metal collar, and a wire guide means having an arm extending generally parallel to the wire bundle. In use the collar is attached to the connector and a tiewrap encircles the arm and the wire bundle to fasten the bundle to the device.

It is also known to use a sleeve, for example a braided sleeve to provide mechanical protection of the wires of a wire bundle, in particular to provide protection against abrasion, and also protection against molten metal, for example solder, which may be dropped onto the wires during soldering of another part of the connector assembly. However, where such a sleeve is used with a strain relief device as described, the sleeve does not protect the wire bundle right up to the collar, that is right up to the point of connection to a connector body. Furthermore, the clamping of the sleeve directly onto the wire bundle is advantageous since it can lead to harmful stresses on the individual wires particularly as a result of transverse stress and/or vibration. This can be a particular problem when the wire insulation comprises a fluoropolymer which, because of the generally low coefficient of friction of such materials, requires tight clamping.

U.S. Pat. No. 4,272,148 discloses a shielded connector housing for use with a cable shielded by braided wire. The housing comprises a ferrule, and mating half shells which cooperate to encircle the ferrule. In use the braided wire shield of the cable is clamped between the ferrule and the mated half shells to provide good electrical contact between the braid and the connector housing, and to provide strain relief for the cable.

The prior art devices comprise intricate components which generally are laborious to assemble. The present invention provides an alternative means for conveniently relieving the strain placed on a wire bundle which obviates the problems of the prior art devices.

A first aspect of the present invention provides a strain relief device for a sleeved wire bundle, which comprises first and second annular gripping members, having respective portions which can be telescoped together, the members being adapted to receive the sleeve between the telescoped portions, and being adapted to grip the sleeve around its perimeter by the telescoping of the said portions; the gripping being effected independently of the wire bundle.

The device of the present invention advantageously provides a convenient means of attachment of a protection sleeve to a connector.

In a preferred embodiment the first gripping member is a snap-fit with the second gripping member, i.e. the members becomes suddenly locked together as they are telescoped, for example by deformation of a part of one of the gripping members, especially by resilient deformation. For example, one of the members may comprise an axially extending arm with a generally radially extending flange at an end thereof. Alternatively, one of the members may comprise a radially expandable or compressible split ring. The snap-fit may be between, for example a flange or split ring and a corresponding rim or recess.

It is an advantage of the present invention that assembly of the strain relief device so as to grip the sleeve involves the simple operation of telescoping one of the gripping members within the other. By the word "telescope" is meant that one of the annular gripping members is slid axially into the other, in the manner of sliding tubes of hand-telescope. When the first gripping member is a snap-fit with the second gripping member, particularly when at least part of one of the members is resiliently deformable, it is preferable that the surface of one member which abuts the other member is profiled, for example inclined.

It is envisaged that one or both of the gripping members may comprise two or more interlocking parts, such as generally arc-like parts which interlock to form an annulus. Such a construction will find particular application when access cannot be gained to the end of the cable, for example because the cable is terminated to a connector.

The gripping members are arranged to grip the sleeve around its perimeter when the members are telescoped together. The sleeve may be gripped for example between a collar on one member and resiliently deformable projections on the other; between a conical mandrel portion on one member and a collar on the other; between generally roughened but parallel surfaces on the two members; or between a series of circumferential flanges and recesses defined by the two members. Other arrangements for gripping the sleeve between the two annular gripping members will be apparent to those skilled in the art.

Advantageously at least one of the gripping members may comprise a support for supporting the wire bundle within the annular gripping members. The support means may conveniently be provided by at least one inwardly directed, preferably resiliently deformable, finger on one of the gripping members. Generally, the support will be provided by a plurality of fingers. Preferably the support is arranged to centre the wire bundle. Centering of the wire bundle is particularly advantageous since pulling stresses and transverse vibrations are transmitted symmetrically to the connector.

Where a plurality of inwardly directed fingers provide the support a large area is achieved over which the strain-relief device and the wire bundle are in contact. Such a large contact area is advantageous since the wear inflicted on the contacted portions of the wire bundle is minimised.

Optionally, further strain relief for the wires of the bundle may be provided by the support, particularly relief from transverse strain and vibration. The strain relief provided by finger(s) may be maximised by a use of the tie-wrap to attach the fingers to the wire bundle.

Preferred embodiments of first gripping member will now be described. In one embodiment, the first gripping member comprises an annular neck and one, or more projections extending axially from the neck in a direction, in the assembled device, towards the second gripping member. Preferably these projections are resiliently deformable, and in a particularly preferred construction the or each projection is provided towards its free end with a transversely extending flange for engaging the second gripping member. If the projections lie outside the second gripping member in the assembled device, the flange will extend inwardly; if the projections lie within the second gripping member, the flange will extend outwardly, and the external diameter of the outwardly extending flange is preferably greater than the internal diameter of the second gripping member. The arrangement comprising flanged projections is particulary advantageous where the projections of the first gripping member are resiliently deformable since the two members can be engaged simply by deforming the projections of the first gripping member to allow the gripping member to be telescoped, the resilience of the projections causing them to spring back and causing the flanges to engage the second gripping member, in a snap-fit. The projections of the first gripping member may instead be non-resiliently deformable, and be arranged to be deformed by the second gripping member when telescoped therewith, to engage the second gripping member in a friction-fit.

Turning now to preferred embodiments of the second gripping member. In one embodiment the second gripping support member comprises an annular neck and a plurality of extension portions extending therefrom, in a direction away from the first gripping member in the assembled device.

The second gripping means is preferably provided with a support in the form of inwardly directed fingers to support the wire bundle. Preferably, the ends of the fingers remote from the neck taper towards each other, the tapering portions acting to centre the wires of the bundle within the strain relief device. The fingers of the second gripping member are preferably arranged uniformly around the neck, this uniform arrangement providing uniform support for the wires in contrast to the known prior art device having a projecting arm that is encircled by a tie wrap, which device provides undesirable one-sided support of the wire bundle.

Preferably the fingers of the second gripping member are resiliently deformable inwardly or outwardly or both. It is advantageous for the fingers to be deformable outwardly since this enables wire bundles to be accommodated which have an external diameter greater than the internal diameter defined by the fingers in their rest, unstressed position.

In a preferred embodiment of the invention, one, preferably the first, of the gripping members is provided with means for engagement to a connector such an electrical connector, or to another device of the invention. As examples the engagement means may comprise a separate collar adapted to interengage the said gripping member and the connector, or the means may be formed integrally with the said gripping member.

Preferably the gripping members and the engagement means are arranged such that the sleeve is gripped around its perimeter independently of the wire bundle, and such that support extends from the end of the sleeve to the engagement means, the support being uniform around the perimeter of the sleeve. Furthermore, the strain relief device is connected directly to the sleeve only, and not also to the wire bundle as in certain prior art devices. The strain relief device of the present invention therefore enables the strain placed on the wires of a sleeved wire bundle to be reduced significantly.

The gripping members may be made for example from metal for example aluminium, or from a polymeric material. Preferred polymers that may be used are polycarbonates or poly-sulphones. Preferably a material is used that has a large elastic region, that is one which can undergo a large strain before plastic deformation occurs.

A second aspect of the present invention provides a strain relief assembly comprising a device according to the invention and a protection sleeve which is received between the telescoped portions of the gripping members, and gripped by the gripping members, the gripping being effected independently of the wire bundle. Preferably the sleeve is adapted to be telescoped on itself so as to extend, in contact, along the outer surface of the outer gripping member, around an end thereof, and back along the inner surface thereof, between the telescoped portions of the gripping members. The opposite inside out arrangement is also possible, that is wherein the end of the sleeve is arranged to be telescoped outside the body of the sleeve. The sleeve may, alternatively pass along the inner surface of the inner gripping member, around an end thereof, and back along the outer surface thereof.

Preferably a sleeve is used that contracts in cross section when subjected to axial tension. This may, conveniently be provided, for example by using a braided sleeve. The use of a sleeve that contracts in cross-section on axial tension is particularly advantageous when the projections of the gripping member are resiliently deformable since any axial tension caused, for example, by vibration of the equipment causes the sleeve to contract in cross-section, which in turn causes the deformable projections to deform inwardly and therefore exert a tighter clamping force on the wires. Hence in this case the contracting sleeve hinders axial pull-out of the wires from the connector. The advantage arises from gripping of the sleeve being effected independently of the wire bundle. Furthermore, since the sleeve is connected to the connector directly via the strain relief device and is not clamped to the wire bundle the sleeve also provides strain relief protection against bending and transverse stress. Thus the sleeve in combination with the strain relief device provides protection against axial pulling and transverse vibrational stresses in addition to providing simple mechanical protection of the wires, for example against abrasion and chemical attack.

The strain relief device may be used for a wire bundle to be connected to a round connector. In this case the annular gripping members are preferably substantially circular in cross-section. The strain relief device may also be used for a non-round wire bundle, including a flat cable, to be connected to a flat connector. In this case the annular gripping members are substantially rectangular in cross-section. Other shapes of gripping members such as oval or elliptical may be used according to the shape of the connector or of the wire bundle.

A third aspect of the present invention relates to a method of providing strain relief in a sleeved wire bundle, the method comprising:

(a) positioning the sleeve around an annular gripping member; and (b) telescoping a portion of the annular gripping member within a portion of another annular gripping member, so as to grip the sleeve around its perimeter between the telescoped portions, the gripping being effected independently of the wire bundle.

Embodiments of the present invention will now be described by way of example, with reference to the accompanying drawings, wherein:

FIGS. 1 and 2, and FIG. 3 are perspective views of the first and second gripping members, respectively of a strain relief device according to the present invention;

Figure 1:
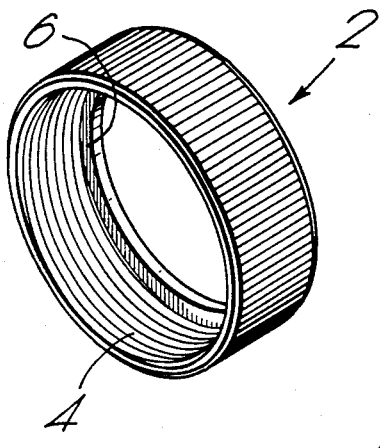

Referring to the drawings FIG. 1 shows an annular collar 2 the internal surface of which is screw threaded at 4 for rigid screw connection to a connector (not shown). The collar thus provides means for engagement, of the strain relief device to a connector. Other means of engagement, for example a bayonet fastening may also be used. The collar is provided on one end with an inwardly directed annular flange 6. This flange 6 provides a stop to prevent withdrawal of the first gripping member from the collar 2 in the direction, in the assembled device, of the second gripping member.

Figure 2:
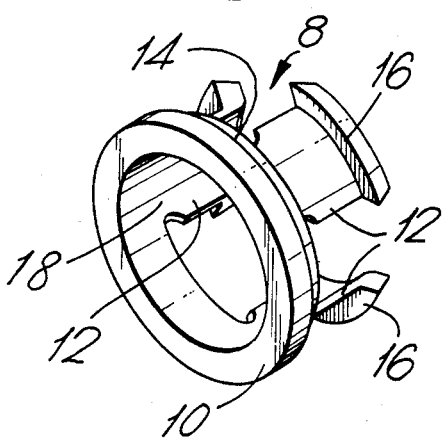

FIG. 2 shows the first gripping member 8. The gripping member 8 comprises an annular neck 10 and three projections 12 extending axially therefrom in a direction substantially axially of the annular neck 10. The projections 12 are uniformly spaced around the neck and are resiliently deformable inwardly. The neck 10 is provided with an outwardly extending annular flange 14 at its base. The diameter of the flange 14 is slightly smaller than diameter of collar 2 to enable the gripping member 8 to be fitted into the collar 2, but is slightly larger than the internal diameter of the flange 6 of the collar 2 such that the gripping member 8 abuts against the flange 6 of collar 2 thus providing the stop to prevent withdrawal of the gripping member 8 from the collar 2. The free ends of the projections 12 are provided with outwardly extending flanges 16 for cooperation with the second gripping member. The flanges 16 extend outwardly beyond the inner diameter of the flange 6 of collar 2. The projections 12 are necked at 18 towards their base in order to enhance the resilient deformability of the projections 12. The neck 10 of the gripping member 8 is provided with notching (not shown) in order releasably to lock the gripping member 8 relative to the collar 2 to prevent their relative rotation. Other forms of locking are also possible.

Figure 3:
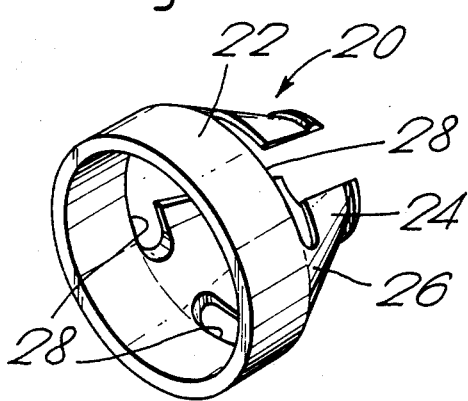

FIG. 3 shows the second gripping member 20 having an annular neck 22 and three uniformly spaced fingers 24 extending therefrom in a direction away from first gripping member in the assembled device. The free ends of the fingers 24 taper towards each other and thereby clamp and centre an inserted wire bundle. The fingers 24 neck significantly at their bases 26 thereby defining bearing surfaces 28, on the neck 22 of the second gripping member 20, for engagement with the flanges 16 of the projections 12 of the first gripping member 8. The inner diameter of the neck 22 of the second gripping member 20 is slightly larger than the outer diameter defined by the body of the projections 12 of the first gripping member 8, and larger than the outer diameter defined by the body of the projections 12 of the first gripping member 8, and is slightly smaller than the outer diameter defined by the outwardly extending flanges 16 on the free ends of the projections 12 of the first gripping member 8. Thus the projections 12 of the first gripping member 8 may be deformed inwardly to insert the first gripping member within the second gripping member. The resilient projections 16 then spring back such that the flanges 16 thereon engage the bearing surfaces 28 of the second gripping member in a snap fit.

Figure 4:
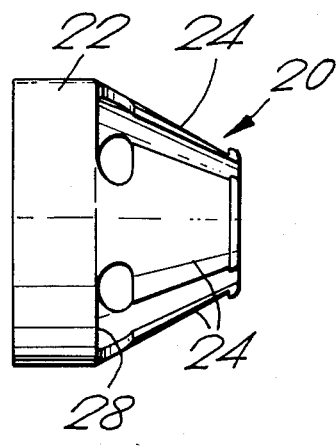
FIG. 4 is a side view of the second gripping member of FIG. 3 in a deformed position.

The fingers 24 of the second gripping member are resiliently deformable both inwardly and outwardly. FIG. 4 shows the fingers 24 of the second gripping member resiliently deformed outwardly. This deformability enables the strain relief device to accommodate wire bundles of different sizes. Preferably the inner diameter defined by the fingers 24 of the second gripping member 20 is from one quarter to one half of the diameter of the connector, this size allowing a large range of wire combinations. The collar and the wire gripping members 8 and 20 are all made from polycarbonate material.

Figure 5:
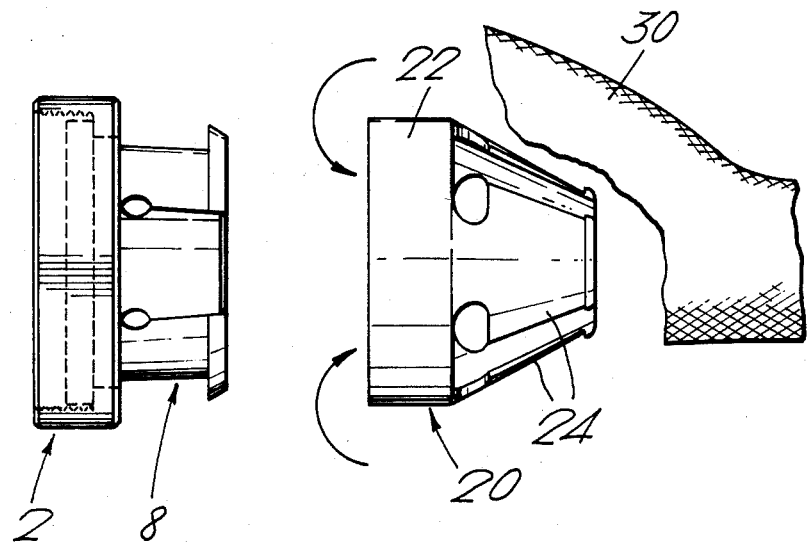
FIGS. 5 and 6 are side elevations of an assembly according to the present invention before and after assembly respectively.
Figure 6:
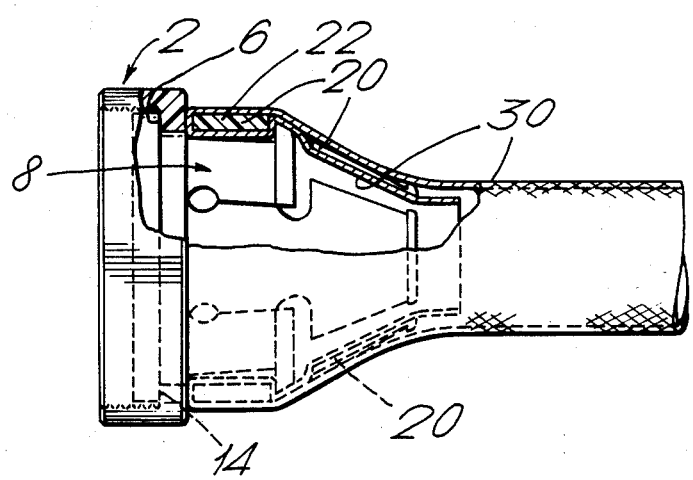

FIG. 5 shows the strain relief device collar 2 positioned around the first gripping member 8, the second gripping member 20, and a braided mechanical protection sleeve 30. The strain relief device parts and the braided sleeve 30 together provide a strain relief assembly according to the present invention. In order to connect the braid 30 to the strain relief device, the braid is passed along the outer surface and around an end of of the second gripping member 20, and is then be folded back on itself to extend along the inner surface of the second gripping member 20. The first gripping member 8 with its prepositioned collar 2 is then telescoped within the second gripping member 20 to grip the braid 30 between the telescoped portions. FIG. 6 shows the parts of FIG. 5 assembled together. The first gripping member 8 has been inserted into the collar 2 such that the flange 14 on the neck of the gripping member 8 abuts against the stop 6 of the collar 2. The braid 30 has been telescoped on itself to surround the gripping member 8, and the first and second wire gripping members 8 and 20 have been telescoped together and engaged in a snapfit. The braid 30 is squeezed and gripped between the first and second wire gripping members and thereby firmly fixed to the strain relief device.

Pulling stresses on the braided wire bundle, for example during dismantling of the connector, cause the braid angle to change and hence the cross-sectional area of the braid to decrease. This in turn causes the braid to deform inwardly the finger 24 of the second gripping member 8. Thus the wires of the bundle are clamped more firmly against the pulling stress. Since the braid 30 is clamped directly to the strain relief device and not via the wire bundle transverse vibrations of the bundle are absorbed by the sleeve. Furthermore, since the braid 30 extends up to the collar 2 it provides mechanical protection right up to the point of contact with the connector.

The following are approximate dimensions of the parts of a typical strain relief device:

| Part | Dimensions | Size in mm |
| --- | --- | --- |
| Collar 2 | | |
| neck | inner diameter | 32.0 |
| | thickness | 1.5 |
| flange 6 | inner diameter | 29.0 |
| First wire gripping member 8 | | |
| flange 14 of neck 10 | outer diameter | 31.5 |
| projections 12 | axial length | 14.0 |
| | length of arc at free ends | 18.0 |

| Part | Dimensions | Size in mm |
|---|---|---|
| | length of arc at necked base 18 | 13.0 |
| | outer diameter defined by flanges 16 | 30.0 |
| Second wire gripping member 20 | | |
| collar 22 | outer diameter | 31.0 |
| fingers 24 | length | 19.0 |
| | inner diameter of circle defined by free ends of fingers 24 in unstressed position | 14 |
| bearing surfaces 28 | circumferential extent | 20.0 |

I claim:

1. A strain relief device for a sleeved wire bundle, which comprises first and second annular gripping members having respective portions which can be telescoped together, and being capable of fitting together with a snap-fit, the members being adapted to receive the sleeve between the telescoped portions, and being adapted to grip the sleeve around its perimeter by the telescoping of the said portions, the gripping being effected independently of the wire bundle, wherein the second gripping member comprises an annular neck adapted to cooperate with the first gripping member to grip the sleeve, and a plurality of deformable fingers extending generally axially from the neck, adapted in operation to support the wire bundle.

2. A strain relief device according to claim 1, wherein one of the gripping members comprises a support for supporting the wire bundle.

3. A strain relief device for a sleeved wire bundle, which comprises first and second annular gripping members having respective portions which can be telescoped together, wherein the first gripping member comprises an annular neck and a plurality of projections extending generally axially from the neck in a direction, in the assembled device, towards the second gripping member, and wherein the or each projection is provided with a flange extending generally transversely of the projection for engaging the second gripping member, the members being adapted to receive the sleeve between the telescoped portions, and being adapted to grip the sleeve around its perimeter by the telescoping of the said portions, the gripping being effected independently of the wire bundle.

4. A strain relief device according to claim 3, wherein the projections are resiliently deformable.

5. A strain relief assembly comprising a strain relief device for a sleeved wire bundle and a protection sleeve, the strain relief device comprising first and second annular gripping members having respective portions which can be telescoped together, the sleeve being received between the telescoped portions of the gripping members and gripped by the gripping members, wherein the sleeve extends along the outer surface of the outer gripping member, around an end thereof, and back along an inner surface thereof, the gripping being effected independently of the wire bundle.

6. A strain relief device for a sleeved wire bundle which comprises first and second annular gripping members having respective portions which can be telescoped together, wherein the first gripping member is provided with a transversely extending flange, and the second gripping member comprises a split ring capable of being radially deformed to allow it to pass over the flange, the members being adapted to receive the sleeve between the telescoped portions, so as to grip the sleeve around its perimeter, the gripping being effected independently of the wire bundle.

7. A strain relief device according to claim 6 wherein the first gripping member further comprises an annular neck and a plurality of projections extending generally axialy from the neck in a direction, in the assembled device, towards the second gripping member, the flange being joined to the neck by the projections.

8. A strain relief device according to claim 6 wherein the second gripping member further comprises a plurality of deformable fingers extending generally axially from the split ring.

9. A strain relief device according to claim 6 wherein the first gripping member is a snap-fit with the second gripping member.

* * * * *